United States Patent
Zhou

(10) Patent No.: US 12,197,475 B2
(45) Date of Patent: Jan. 14, 2025

(54) METHOD AND APPARATUS FOR PROCESSING MAP POINT LOCATION INFORMATION, AND SERVER

(71) Applicant: ZHEJIANG UNIVIEW TECHNOLOGIES CO., LTD., Zhejiang (CN)

(72) Inventor: Renyi Zhou, Zhejiang (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 477 days.

(21) Appl. No.: 17/602,972

(22) PCT Filed: Oct. 18, 2019

(86) PCT No.: PCT/CN2019/111826
§ 371 (c)(1),
(2) Date: Oct. 11, 2021

(87) PCT Pub. No.: WO2020/206972
PCT Pub. Date: Oct. 15, 2020

(65) Prior Publication Data
US 2022/0197932 A1 Jun. 23, 2022

(30) Foreign Application Priority Data
Apr. 11, 2019 (CN) .......................... 201910286969.2

(51) Int. Cl.
*G06F 16/00* (2019.01)
*G06F 16/22* (2019.01)
(Continued)

(52) U.S. Cl.
CPC .......... *G06F 16/29* (2019.01); *G06F 16/2237* (2019.01); *G06F 16/24556* (2019.01)

(58) Field of Classification Search
CPC ................. G06F 16/29; G06F 16/2237; G06F 16/24556
See application file for complete search history.

(56) References Cited

U.S. PATENT DOCUMENTS

| 2002/0165854 A1* | 11/2002 | Blayvas | ................ G06F 18/41 |
| 2013/0066849 A1* | 3/2013 | Saeki | .................... G06F 16/80 |
| | | | 707/E17.017 |

(Continued)

FOREIGN PATENT DOCUMENTS

| CN | 107291874 A | 10/2017 |
| CN | 107423361 A | 12/2017 |

(Continued)

OTHER PUBLICATIONS

Office Action in Chinese Application No. 201910286969.2, dated Aug. 16, 2023, 8 pages including English translation.
(Continued)

*Primary Examiner* — Dinku W Gebresenbet
(74) *Attorney, Agent, or Firm* — Morgan, Lewis & Bockius LLP

(57) ABSTRACT

Provided are a method and apparatus for processing map point location information and a server. The method includes steps described below. A total number of point locations within a to-be-marked region in an electronic map is acquired, and the to-be-marked region is divided into a multiple subregions according to the total number of point locations; where the multiple subregions have the same length in a longitude direction and the same length in a latitude direction. The multiple point locations are divided into the plurality of subregions respectively according to location information of the multiple point locations within the to-be-marked region. Numbers of point locations within the multiple subregions are acquired respectively, and the length of the multiple subregions in the longitude direction and the length of the multiple subregions in the latitude (Continued)

direction are adjusted according to the numbers of point locations within the multiple subregions.

20 Claims, 5 Drawing Sheets

(51) Int. Cl.
  *G06F 16/2455* (2019.01)
  *G06F 16/29* (2019.01)

(56) References Cited

U.S. PATENT DOCUMENTS

| | | | | |
|---|---|---|---|---|
| 2013/0110802 | A1* | 5/2013 | Shenoy | G06F 16/955 707/706 |
| 2015/0178361 | A1* | 6/2015 | Ueno | G06F 16/254 707/602 |
| 2015/0338234 | A1* | 11/2015 | Seastrom | G01C 21/3679 701/409 |
| 2016/0070984 | A1* | 3/2016 | Watts | G06F 16/50 382/201 |
| 2016/0337804 | A1* | 11/2016 | Kim | H04W 4/33 |
| 2018/0252536 | A1* | 9/2018 | Dorum | G01C 21/3673 |
| 2019/0034440 | A1 | 1/2019 | Li et al. | |
| 2019/0094870 | A1* | 3/2019 | Afrouzi | G05D 1/0219 |
| 2019/0228337 | A1* | 7/2019 | Zhang | H04W 4/029 |

FOREIGN PATENT DOCUMENTS

| | | |
|---|---|---|
| CN | 109002451 A | 12/2018 |
| CN | 109241234 A | 1/2019 |
| CN | 109327699 A | 2/2019 |

OTHER PUBLICATIONS

Search Report in Chinese Application No. 201910286969.2, dated Aug. 16, 2023, 3 pages including English translation.

International Search Report for Application No. PCT/CN2019/111826, dated Dec. 25, 2019, 4 pages including English translation.

Kelly et al., "Quadtree Construction on the GPU: A Hybrid CPU-GPU Approach", Semantic Scholar, Jan. 1, 2010, XP05598001, Retrieved from the Internet: URL:https://www.sccs.swarthmore.edu/users/10/mkelly1/quadtrees.pdf [retrieved on Nov. 10, 2022].

Fox et al., "Spatio-temporal indexing in non-relational distributed databases", 2013 IEEE International Conference on Big Data, IEEE, Oct. 6, 2013, pp. 291-299.

Extended European Search Report of Application No. 19923964.1, dated Nov. 18, 2022, 8 pages.

* cited by examiner

METHOD AND APPARATUS FOR PROCESSING MAP POINT LOCATION INFORMATION, AND SERVER

CROSS-REFERENCE TO RELATED APPLICATIONS

This is a National Stage Application, filed under 35 U.S.C. 371, of International Patent Application No. PCT/CN2019/111826, filed on Oct. 18, 2019, which claims priority to Chinese Patent Application No. 201910286969.2 filed with the China National Intellectual Property Administration (CNIPA) on Apr. 11, 2019, the disclosures of which are incorporated herein by reference in their entireties.

TECHNICAL FIELD

The present application relates to the technical field of electronic maps, for example, a method and apparatus for processing map point location information and a server.

BACKGROUND

A geographic information system (geo-information system, GIS) can implement the integration of the visualization effect and geographic analysis functions of a map with general database operations (such as query and statistical analysis), and storage management analysis on spatial information. With the development of video surveillance networks, pure GIS services can no longer satisfy requirements of functions such as loading and searching of large amounts of data. In the related art, data is subjected to dimensionality reduction and caching by adopting the manner of GeoHash encoding, and then related geographic information data is returned through distance ranking during searching. The GeoHash algorithm is an efficient multi-dimensional spatial point search algorithm and can achieve the rapid search of point locations. However, the conventional GeoHash encoding manner adopted in the related art does not consider the actual distribution of point locations, resulting in a large difference in time for subsequently searching multiple search regions, and thus the overall time smoothness of the search work is relatively poor.

SUMMARY

The present application provides a method and apparatus for processing map point location information and a server so as to improve the large difference in time for subsequently searching multiple search regions and a relatively poor overall time smoothness of the search work since the conventional GeoHash encoding manner adopted does not consider the actual distribution of point locations.

An embodiment of the present application provides a method for processing map point location information, the method is applied to a server and includes steps described below.

A total number of point locations within a to-be-marked region in an electronic map is acquired, and the to-be-marked region is divided into multiple subregions according to the total number of point locations; where the multiple subregions have the same length in a longitude direction and the same length in a latitude direction.

The multiple point locations are divided into the multiple subregions respectively according to location information of the multiple point locations within the to-be-marked region.

Numbers of point locations within the multiple subregions are acquired respectively, and the length of the multiple subregions in the longitude direction and the length of the multiple subregions in the latitude direction are adjusted according to the numbers of point locations within the multiple subregions to enable a difference value between the numbers of point locations within the multiple adjusted subregions to be less than a preset threshold.

Another embodiment of the present application further provides an apparatus for processing map point location information, the apparatus is applied to a server and includes a first division module, a second division module and an adjustment module.

The first division module is configured to acquire a total number of point locations within a to-be-marked region in an electronic map, and divide the to-be-marked region into multiple subregions according to the total number of point locations; where the multiple subregions have the same length in a longitude direction and the same length in a latitude direction.

The second division module is configured to divide the multiple point locations into the multiple subregions respectively according to location information of the multiple point locations within the to-be-marked region.

The adjustment module is configured to acquire numbers of point locations within the multiple subregions respectively, and adjust, according to the numbers of point locations within the multiple subregions, the length of the multiple subregions in the longitude direction and the length of the multiple subregions in the latitude direction to enable a difference value between the numbers of point locations within the multiple adjusted subregions to be less than a preset threshold.

Another embodiment of the present application further provides a server, including a memory, a processor, and a computer program stored in the memory and executable on the processor, and when the processor executes the computer program to implement the preceding method.

Figure 1:
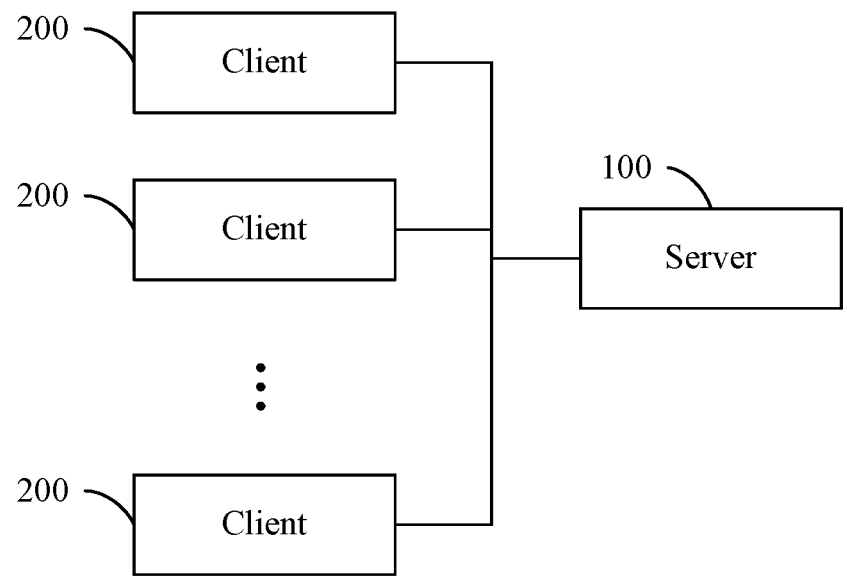
FIG. 1 is a schematic diagram of an application scenario of a method for processing map point location information according to an embodiment of the present application.

REFERENCE LIST 100 server
110 processor 120 memory
130 apparatus for processing map point location information
131 first division module
132 second division module
133 adjustment module
200 client

DETAILED DESCRIPTION

Technical schemes in embodiments of the present application will be described in conjunction with drawings in the embodiments of the present application. The embodiments described herein are part, not all, of the embodiments of the present application. Components of the embodiments of the present application described and illustrated in the drawings herein may be arranged and designed through various configurations.

Therefore, the description of the embodiments of the present application shown in the drawings herein is not intended to limit the scope of the present application, but merely illustrates the selected embodiments of the present application. Similar reference numerals and letters indicate similar items in the drawings, and therefore, once an item is defined in one drawing, the item needs no definition and explanation in subsequent drawings.

Referring to FIG. 1, FIG. 1 is a schematic diagram of an application scenario of a method for processing map point location information according to an embodiment of the present application. This scenario includes a server 100 and a client 200, and the server 100 is communicatively connected to the client 200 via a network for data communication or interaction. In the present embodiment, multiple clients 200 are provided, and the multiple clients 200 are communicatively connected to the server 100. In the present embodiment, the client 200 is a terminal device with a display device, such as a mobile phone, a computer, a tablet computer, etc. The client 200 is installed with a related search application, through which a user may achieve the search function of point locations. The server 100 is a background server corresponding to the search application, which may achieve processing of related information of the search application and interaction of information and data with the client 200. The server 100 may be a separate server 100 or a cluster of servers 100, and it is not limited herein.

Figure 2:
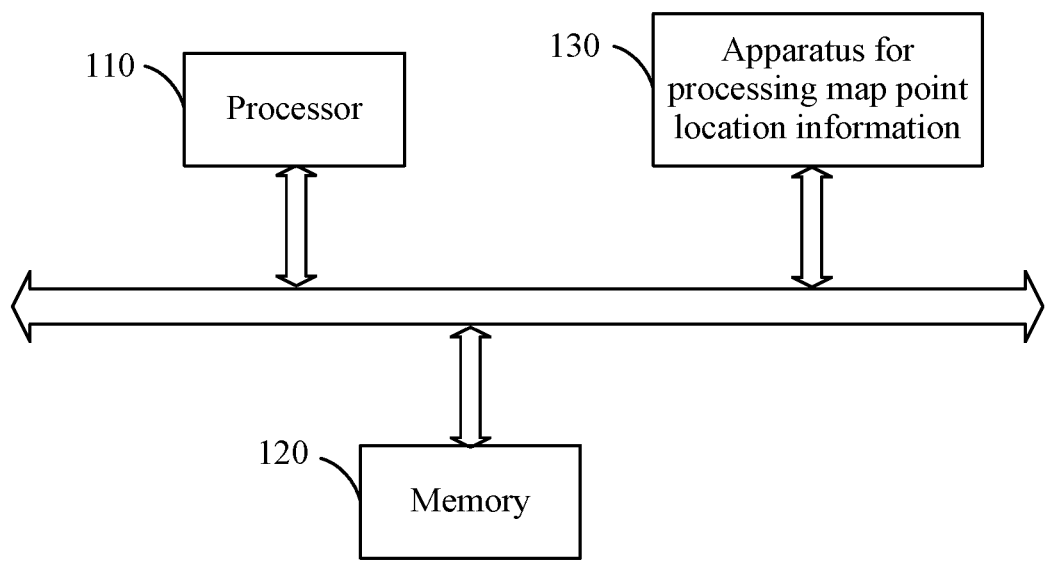
FIG. 2 is a structural block diagram of a server according to an embodiment of the present application.

Referring to FIG. 2, FIG. 2 is a structural block diagram of a server 100 according to an embodiment of the present application. In the present embodiment, the server 100 includes an apparatus 130 for processing map point location information, a processor 110 and a memory 120. In the server 100, the memory 120 is directly or indirectly electrically connected to the processor 110 to achieve data transmission or interaction. The apparatus 130 for processing map point location information includes at least one software function module that may be stored in the memory 120 in the form of software or firmware or be solidified in an operating system of the server 100. The processor 110 is configured to execute an executable module stored in the memory 120, such as the software function module or a computer program included in the apparatus 130 for processing map point location information.

Figure 3:
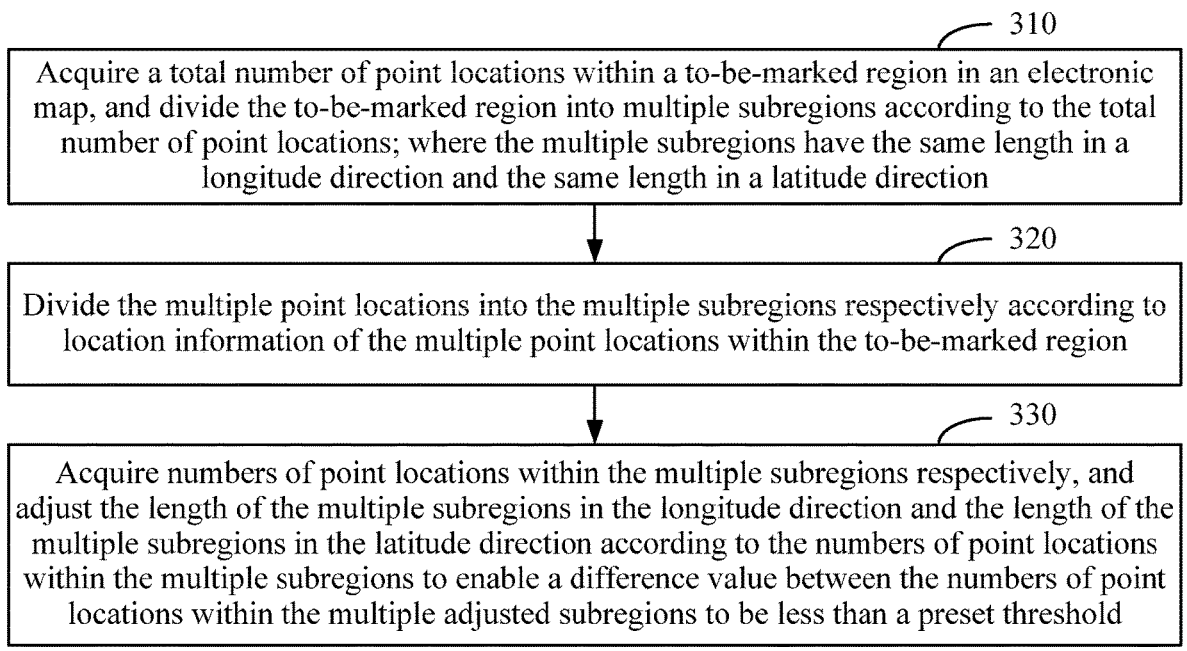
FIG. 3 is a flowchart of a method for processing map point location information according to an embodiment of the present application.

Referring to FIG. 3, FIG. 3 is a flowchart of a method for processing map point location information and applied to the preceding server 100 according to an embodiment of the present application. The method provided in the present application is not limited to the sequence described in FIG. 3 and the following. Steps shown in FIG. 3 will be described below.

In step 310, a total number of point locations within a to-be-marked region in an electronic map is acquired, and the to-be-marked region is divided into multiple subregions according to the total number of point locations; where the multiple subregions have the same length in a longitude direction and the same length in a latitude direction.

In step 320, the multiple point locations are divided into the multiple subregions respectively according to location information of the multiple point locations within the to-be-marked region.

In step 330, numbers of point locations within the multiple subregions are acquired respectively, and the length of the multiple subregions in the longitude direction and the length of the multiple subregions in the latitude direction are adjusted according to the numbers of point locations within the multiple subregions to enable a difference value between the numbers of point locations within the multiple adjusted subregions to be less than a preset threshold.

In the present embodiment, the server 100 may acquire related information of a point location in an electronic map of a certain region from other external systems, such as location information of the point location, and the type of a device corresponding to the point location. In the present embodiment, an example in which the point location is a camera device is used for illustration. The server 100 may acquire and store related information of a point location in a certain region from, for example, a traffic monitoring system. In addition, the server 100 may regularly detect whether point location information on the traffic monitoring system side is updated. If the point location information is updated, the stored corresponding point location information may be updated in time to ensure the accuracy of the point location information on the electronic map.

When it is necessary to process a to-be-marked region in the electronic map, the total number of point locations within the to-be-marked region may be acquired. In an embodiment, the to-be-marked region may be a region including a city or a region including a city downtown, which is not limited herein. For example, if the to-be-marked region is a region containing a city, a point location with the minimum longitude value, a point location with the maximum longitude value, a point location with the minimum latitude value and a point location with the maximum latitude value in the region where the city is located on the electronic map may be acquired. Then, a square frame is determined according to the acquired point locations as the to-be-marked region containing the city region.

In the embodiment, the to-be-marked region is first divided into multiple subregions according to the total number of point locations within the to-be-marked region. In an embodiment, the total number of point locations may be divided by 100 and then subjected to a square root calculation to obtain the value l as a standard for the division of subregions. For example, the to-be-marked region is divided into l units in the longitude direction, and the to-be-marked region is divided into l units in the latitude direction. In this way, the to-be-marked region can be divided into l*l subregions, and the multiple subregions have the same length in the longitude direction and the same length in the latitude direction. Of course, the to-be-marked region may also be divided into subregions in other manners, which is not limited in the embodiment.

After the to-be-marked region is divided into the multiple subregions, longitude information and latitude information of the multiple subregions may be determined. Location information of the multiple point locations within the to-be-marked region may be acquired, and the multiple point locations are divided into the multiple subregions respectively according to the location information of the multiple point locations.

Since the sparsity and density of point locations in different regions are inconsistent, the above manner for division of subregions will lead to a large number of point locations in some subregions and a small number of point locations in other subregions due to the fact that the multiple subregions have the same length in the longitude direction and the multiple subregions have the same length in the latitude direction. This situation will cause instability in the subsequent point location search.

Based on the above considerations, in the embodiment, the length of the multiple subregions in the longitude direction and the length of the multiple subregions in the latitude direction are adjusted according to numbers of point locations within the multiple subregions to enable a difference value between the numbers of point locations within the multiple adjusted subregions to be less than a preset threshold. In this way, the point locations within the multiple subregions are similar in numbers, and thus the search stability of different subregions is improved.

Figure 4:
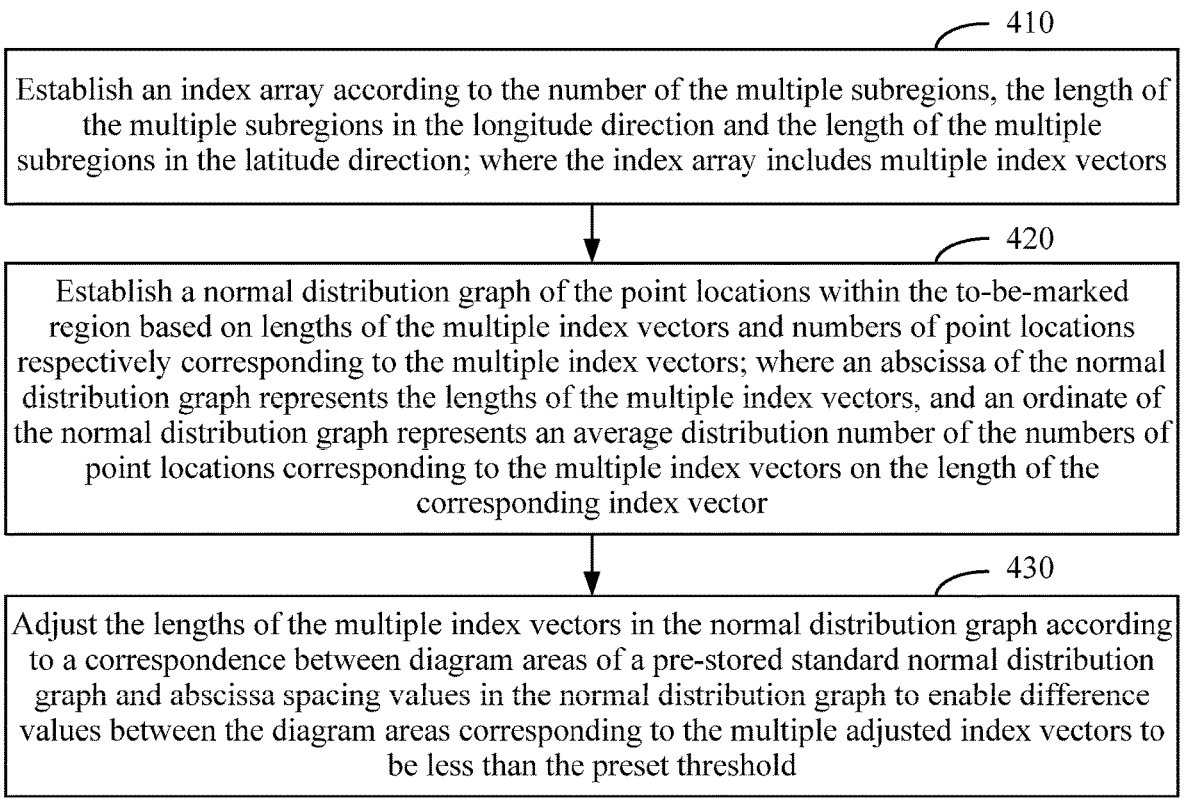
FIG. 4 is a flowchart of substeps of step 330 in FIG. 3 according to an embodiment of the present application.

In an embodiment, reference is made to FIG. 4. In the embodiment, the step in which the length of the multiple subregions in the longitude direction and the length of the multiple subregions in the latitude direction are adjusted according to the numbers of point locations within the multiple subregions to enable the difference value between the numbers of point locations within the multiple adjusted subregions to be less than the preset threshold may be implemented through step 410 to step 430.

In step 410, an index array is established according to the number of the multiple subregions, the length of the multiple subregions in the longitude direction and the length of the multiple subregions in the latitude direction; where the index array includes multiple index vectors.

In step 420, a normal distribution graph of the point locations within the to-be-marked region is established based on lengths of the multiple index vectors and numbers of point locations respectively corresponding to the multiple index vectors; where the abscissa of the normal distribution graph represents the lengths of the multiple index vectors, and the ordinate of the normal distribution graph represents a quotient of the number of point locations corresponding to each of the multiple index vectors and a length of the each of the multiple index vectors.

In step 430, the lengths of the multiple index vectors in the normal distribution graph are adjusted according to a correspondence between diagram areas and abscissa spacing values in the normal distribution graph to enable difference values between the diagram areas corresponding to the multiple adjusted index vectors to be less than the preset threshold.

It can be seen that the division of subregions may be performed according to the total number of point locations within the to-be-marked region, and related longitude information and related latitude information of the divided subregions may be marked in the form of an index array. In an embodiment, the index array may be established according to the number of the multiple subregions, the length of the multiple subregions in the longitude direction and the length of the multiple subregions in the latitude direction. In the embodiment, the index array includes multiple index vectors. In an embodiment, the index array may include a longitude index array and a latitude index array, the longitude index array includes multiple longitude index vectors, the latitude index array includes multiple latitude index vectors, and the longitude index array and the latitude index array may be expressed by the following formulas:

$$d_1 = [[\mathrm{lng}_1, \mathrm{lng}_2], [\mathrm{lng}_3, \mathrm{lng}_4], \ldots, [\mathrm{lng}_n, \mathrm{lng}_{n+1}]](n=2l-1, l=1,2,3\ldots);$$

$$d_2 = [[\mathrm{lat}_1, \mathrm{lat}_2], [\mathrm{lat}_3, \mathrm{lat}_4], \ldots, [\mathrm{lat}_n, \mathrm{lat}_{n+1}]](n=2l-1, l=1,2,3\ldots).$$

$d_1$ represents the longitude index array, $[\mathrm{lng}_n, \mathrm{lng}_{n+1}]$ represents a longitude index vector, and the difference between $\mathrm{lng}_n$ and $\mathrm{lng}_{n+1}$ represents the length of the longitude index vector. $d_2$ represents the latitude index array, $[\mathrm{lat}_n, \mathrm{lat}_{n+1}]$ represents a latitude index vector, and the difference between $\mathrm{lat}_n$ and $\mathrm{lat}_{n+1}$ represents the length of the latitude index vector. One longitude index vector and one latitude index vector may represent one subregion, the length of the longitude index vector represents the length of the one subregion in the longitude direction, and the length of the latitude index vector represents the length of the one subregion in the latitude direction. Therefore, point locations falling in the subregion may belong to the index vector composed of the corresponding longitude index vector and latitude index vector.

Figure 5:
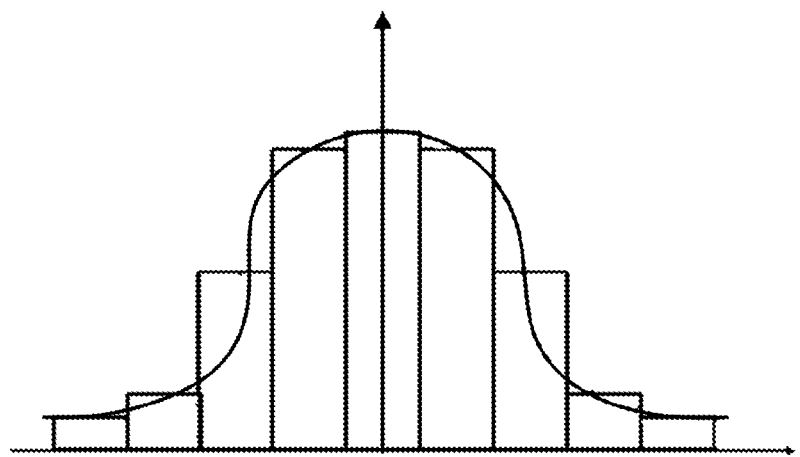
FIG. 5 is a graph showing a relationship between index vectors and numbers of point locations before adjustment according to an embodiment of the present application.

The normal distribution graph of the point locations within the to-be-marked region may be established based on lengths of the multiple index vectors and numbers of point locations respectively corresponding to the multiple index vectors. In an embodiment, in the case where the number of point locations within the to-be-marked region is relatively large, numbers of point locations belonging to different subregions in the to-be-marked region are normally distributed, and the abscissa of the obtained normal distribution graph represents the lengths of the multiple index vectors, and the ordinate represents the quotient of the number of point locations corresponding to each index vector and the length of the each index vector. In an embodiment, the abscissa axis is divided into multiple segments, each segment is used as one abscissa spacing and corresponds to one index vector, and the abscissa spacing value is the length of the index vector. Since the ordinate represents the quotient of the number of point locations corresponding to each index vector and the length of the each index vector, the diagram area enclosed by each abscissa spacing value and the corresponding ordinate is the number of point locations corresponding to each index vector. The finally obtained normal distribution graph of point locations is shown in FIG. 5. It can be seen that multiple abscissa spacing values are equal to each other. Due to the normal distribution of the graph, the numbers of point locations corresponding to the multiple index vectors are quite different, which is not conducive to the subsequent point location search.

In the present embodiment, the server 100 may further calculate a correspondence between diagram areas and abscissa spacing values in the preceding obtained normal distribution graph, that is, a correspondence between distances of two points on the abscissa axis and areas enclosed by ordinates corresponding to the two points and the abscissas of the two points. In an embodiment, a fitting function of the normal distribution graph may be calculated according to graph parameters of the normal distribution graph so as to obtain the correspondence between the diagram areas and the abscissa spacing values in the normal distribution graph. The lengths of the multiple index vectors in the normal distribution graph may be adjusted according to the correspondence to enable difference values between the diagram areas corresponding to the multiple adjusted index vectors to be less than the preset threshold. That is, distances between two points on the abscissa axis are adjusted to enable areas enclosed by ordinates corresponding to every two points and the every two points are basically consistent with each other. In this way, in the manner of adjusting the lengths of the index vectors, that is, adjusting the lengths of the subregions in the longitude direction and the lengths of the subregions in the latitude direction, the multiple subregions are adjusted to have the basically same number of point locations.

In the embodiment, when the multiple index vectors are adjusted according to the correspondence between the diagram areas and the abscissa spacing values in the normal distribution graph, an initial abscissa spacing value may be preset first, and then the correspondence between the diagram areas and the abscissa spacing values in the normal distribution graph is found according to the preset initial abscissa spacing value to obtain a preset diagram area corresponding to the preset initial abscissa spacing value.

Figure 6:
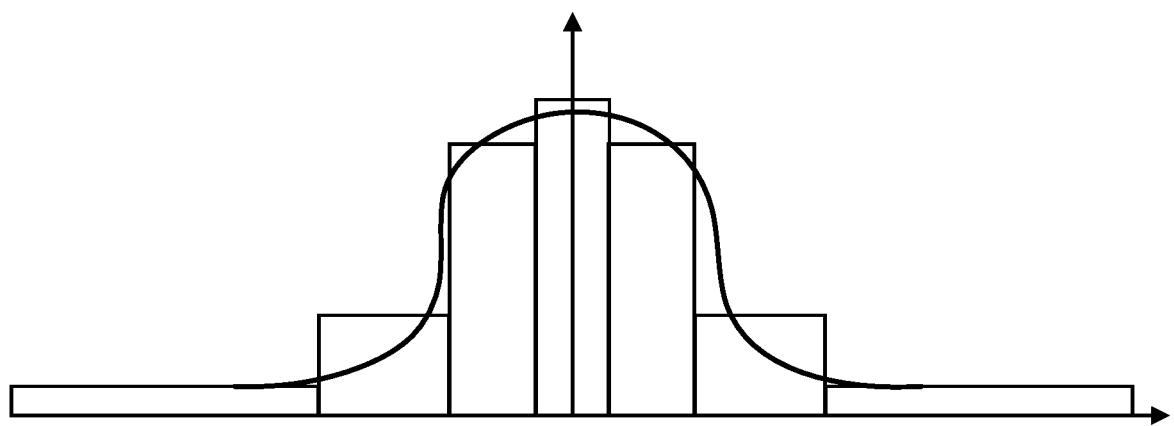
FIG. 6 is a graph showing a relationship between index vectors and numbers of point locations after adjustment according to an embodiment of the present application.

In an embodiment, the preset initial abscissa spacing value is an empirical value, coordinate x1 and coordinate x2 are symmetrically selected on the abscissa axis from two sides of the central axis of the normal distribution graph (it is assumed that x1 is in the positive direction of the abscissa axis and x2 is in the negative direction of the abscissa axis), and the distance between x1 and x2 is the preset initial abscissa spacing value. According to the fitting function of the normal distribution graph, coordinate y1 and coordinate y2 corresponding to x1 and x2 in the normal distribution graph may be obtained. The area enclosed by x1, x2, y1 and y2 is the diagram area corresponding to the coordinate x1 and the coordinate x2, and the diagram area is set as the preset diagram area. Then, other abscissas are set extending in the positive (or negative) direction of the abscissa axis. For example, coordinate X3 is set in the positive direction of the abscissa axis. According to the fitting function of the normal distribution graph, coordinate y3 corresponding to x3 in the normal distribution graph may be obtained, and the difference between the preset diagram area and the diagram area obtained by multiplying the value of the abscissa spacing between x1 and x3 by the ordinate value of y3 is to be less than the preset threshold. Finally, the distribution of diagram areas formed by the numbers of point locations corresponding to the multiple index vectors obtained after adjustment may be shown in FIG. 6. It can be seen from FIG. 6 that the numbers of point locations corresponding to the multiple index vectors may be basically consistent.

Through the above process, a grid that divides the to-be-marked region into multiple subregions of different sizes may be established on the basis of the electronic map.

Figure 7:
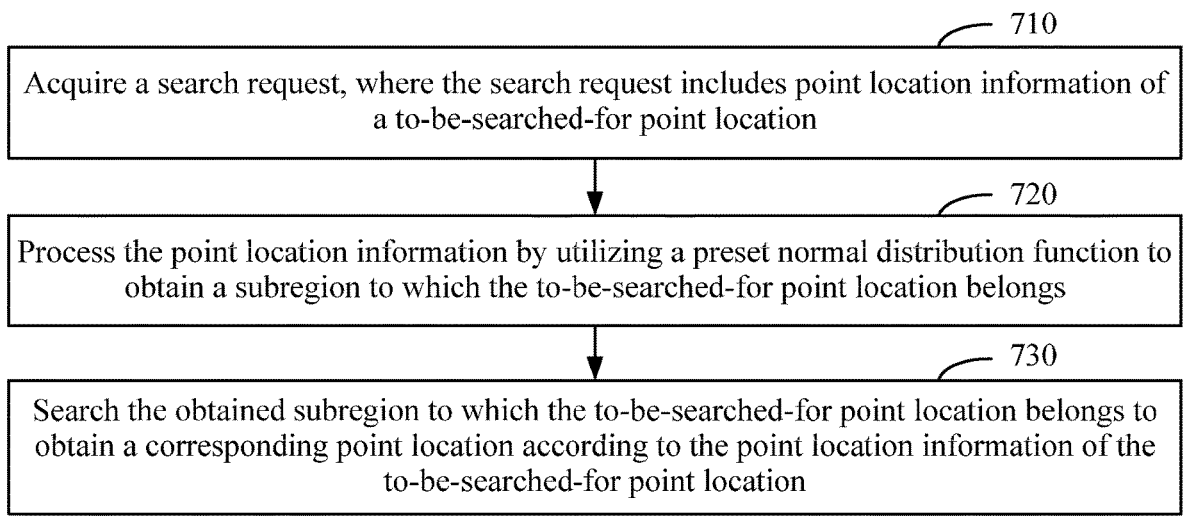
FIG. 7 is a flowchart of another method for processing map point location information according to an embodiment of the present application.

Referring to FIG. 7, based on above, the method for processing map point location information provided in the embodiment further includes step 710 to step 730.

In step 710, a search request is acquired, and the search request includes point location information of a to-be-searched-for point location.

In step 720, the point location information is processed by utilizing a preset normal distribution function to obtain a subregion to which the to-be-searched-for point location belongs.

In step 730, the obtained subregion to which the to-be-searched-for point location belongs is searched to obtain a corresponding point location according to the point location information of the to-be-searched-for point location.

When the point location search needs to be performed, the user may initiate a search request through the client 200 to the server 100. In the present embodiment, the search request includes point location information of a to-be-searched-for point location, for example, may include one to-be-searched-for point location, or point locations in one region. After receiving the search request, the server 100 may process the point location information of the to-be-searched-for point location by utilizing a preset normal distribution function to obtain a subregion to which the to-be-searched-for point location belongs. In this way, traversal search in a large range is avoided, and the search is speeded up.

After the subregion to which the to-be-searched-for point location belongs is determined, targeted search is performed on the subregion to which the to-be-searched-for point location belongs, so as to obtain a point location within the subregion to which the to-be-searched-for point location belongs and having the same point location information of the to-be-searched-for point location. The server 100 may feed back the point location information of the searched-for point location to the client 200, and the client 200 displays the received point location information on the electronic map of the corresponding search application according to the received point location information, so that the user can view the point location information.

In the present embodiment, it is considered that when the number of point locations that the user needs to search for is relatively large, the time required for the background search is relatively long, to avoid the poor use experience of the user caused by the lack of feedback information for a long time, when performing the point location search, the server 100 may feed back point location information of a point location obtained by searching in a preset duration to the client 200 sending the search request at preset-duration intervals, such as 50 ms or 100 ms. In this way, even if the volume of the point location search initiated by the client 200 is relatively large, part of the searched-for point location information can be fed back to the user in a short time to avoid the poor experience caused by no feedback for a long time.

After feeding back the searched-for point location information to the client 200, the server 100 records the point location information currently fed back to the client 200.

In some cases, if the volume of search is relatively large and the time for search is relatively long, during the search process, the user may abort the search, or the search may be interrupted due to network reasons. Therefore, after receiving the search request initiated by the client 200, the server 100 will first detect whether the point location information of the point location that corresponds to the search request and has been fed back to the client 200 is currently stored. That is, it is detected whether the search request currently initiated by the client 200 is the first request or is initiated again after being interrupted for some reasons. If it is detected that the search request currently initiated by the client 200 is not the first request, it indicates that the server 100 has performed searching for the search request before, and part of location information has been searched for and fed back to the client 200. It can be seen from the above that when searching, the server 100 will feed back the searched-for part of point location information to the client 200 and record this part of point location information. Therefore, when the received search request is not the first request, to avoid repeated search work, the server 100 may filter out the point location fed back to the client 200 from point locations within the subregion to which the to-be-searched-for point location belongs, and then search the filtered subregion to obtain the corresponding point location according to the point location information of the to-be-searched-for point location. Then, the point location information of the searched-for point location is fed back to the client 200.

Considering that some point locations are only displayed to users having a corresponding permission, each point location may be marked with a permission tag when the point location information is preset. The search request initiated by the client 200 includes permission information. The server 100 extracts point locations corresponding to the permission information in the search request according to permission tags which are sent by the client 200 and of multiple point locations within the subregion to which the to-be-searched-for point location belongs, then searches the extracted point locations to obtain the point location corresponding to the point location information, and feeds back the point location information of the searched-for point location to the client 200.

In an embodiment, considering that point locations are dense in some regions, if point location information of all densely distributed point locations is displayed, on the one hand, the information display will be unclear due to the overlap between the point location information, and on the other hand, the user may not need information of all these point locations. Apparently, this display manner cannot satisfy actual requirements of the user. Therefore, in this case, aggregation display may be performed in the manner of aggregating multiple point locations.

In an embodiment, the search request initiated by the user may carry an aggregation tag, or the server 100 may independently determine whether aggregation processing is required according to the information of the to-be-searched-for point location. If the search request carries the aggregation tag, or it is determined that the aggregation processing is required, the server 100 may perform the aggregation processing on point location information of point locations obtained by searching, and feed back aggregation information of the point locations obtained after the aggregation processing to the client 200 sending the search request. For example, if the to-be-searched-for point locations are multiple point locations located closely within one region, displaying all these multiple point locations may cause the overlap between point locations. Therefore, a center location of the multiple points may be acquired, and the center location is marked in the manner of dot marking to characterize the multiple point locations. For example, the number of the multiple point locations may be marked on the dot. In this way, when the aggregated information is fed back to the client 200 for display, the user can clearly know the number of point locations contained in the nearby location.

In this embodiment, the above scheme for processing map point location information is used to test actual point locations in a first-tier domestic city. The number of point locations used in the test is about 100000, and when the client 200 displays, 200 point locations per page is used as an example. After 10 pages are searched, the point location loading duration, the peripheral point location search duration and the region point location aggregation duration related to the client 200 may be shown in Table 1 to Table 3 respectively.

TABLE 1

Point location loading duration table

| Point location loading | Direct loading manner | Conventional GeoHash manner | Scheme of the present application |
|---|---|---|---|
| Downtown | 300000 ms | 1102 ms | 675 ms |
| Urban region | 300000 ms | 842 ms | 720 ms |
| Rural-urban fringe | 300000 ms | 420 ms | 540 ms |

It can be seen from the data in Table 1 that when point location loading is processed and point locations in the downtown are loaded, the scheme provided by the present application is much better than the conventional direct loading manner and twice the cache speed of the conventional GeoHash. When point locations in other regions of the urban region are loaded, the performance of the scheme is close to the performance of the conventional GeoHash manner. When the loading is performed in the region far away from the urban region, the performance of the scheme is slightly lower than the performance of the conventional GeoHash manner since redundant traversal point locations of the scheme are generally more than redundant traversal point locations of the conventional GeoHash manner.

TABLE 2

Point location search duration table

| Peripheral point location search | Direct loading manner | Conventional GeoHash manner | Scheme of the present application |
|---|---|---|---|
| Downtown | 612761 ms | 312 ms | 120 ms |
| Urban region | 684126 ms | 110 ms | 112 ms |
| Rural-urban fringe | 594785 ms | 104 ms | 160 ms |

TABLE 3

Region point location aggregation duration table

| Region point location aggregation | Direct loading manner | Conventional GeoHash manner | Scheme of the present application |
|---|---|---|---|
| Downtown | 754239 ms | 121561 ms | 40246 ms |
| Urban region | 664124 ms | 86241 ms | 30416 ms |
| Rural-urban fringe | 542671 ms | 45122 ms | 31642 ms |

It can be seen from the data in Table 2 that when peripheral point location search is performed, the performance of the direct loading manner is very low since point locations in the whole region need to be ranked according to how far the point locations are. When searching for point locations in the downtown region, the scheme provided by the present application is about three times faster than the conventional GeoHash manner. When searching for point locations in other regions of the urban region and point locations in regions far away from the urban region, the performance of the conventional GeoHash manner is relatively close to the performance of the scheme.

It can be seen from the data in Table 3 that when point location aggregation is processed, the speed of the scheme of the present application is about three times the speed of the conventional GeoHash manner for point location aggregation in the downtown region and other regions of the urban region. When aggregation is performed in regions far away from the urban region, the performance of the scheme of the present application is close to the performance of the conventional GeoHash manner.

Figure 8:
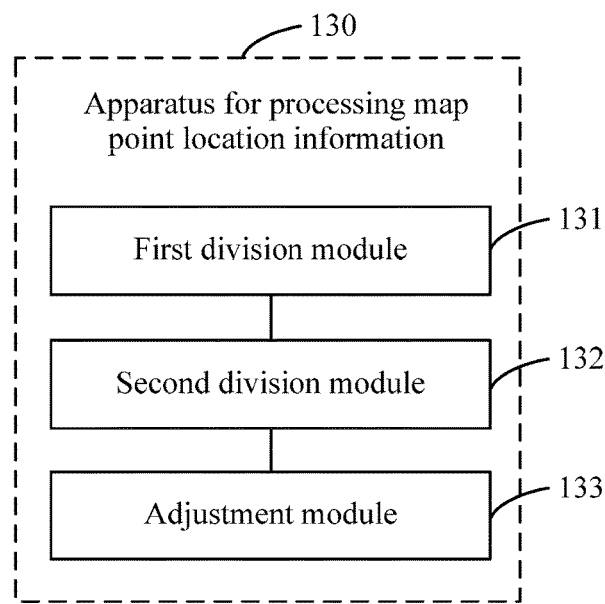
FIG. 8 is a block diagram of function modules of an apparatus for processing map point location information according to an embodiment of the present application.

Referring to FIG. 8, another embodiment of the present application further provides an apparatus 130 for processing map point location information and applied to the preceding server 100. The apparatus 130 for processing map point location information includes a first division module 131, a second division module 132 and an adjustment module 133.

The first division module 131 is configured to acquire a total number of point locations within a to-be-marked region in an electronic map, and divide the to-be-marked region into multiple subregions according to the total number of point locations; where the multiple subregions have the same length in a longitude direction and the same length in a latitude direction. In an embodiment, the first division module 131 may be configured to execute the preceding step 310, and for the implementation of the first division module 131, reference may be made to the preceding content related to step 310.

The second division module 132 is configured to divide the multiple point locations into the multiple subregions respectively according to location information of the multiple point locations within the to-be-marked region. In an embodiment, the second division module 132 may be configured to execute the preceding step 320, and for the implementation of the second division module 132, reference may be made to the preceding content related to step 320.

The adjustment module 133 is configured to acquire numbers of point locations within the multiple subregions respectively, and adjust, according to the numbers of point locations within the multiple subregions, the length of the multiple subregions in the longitude direction and the length of the multiple subregions in the latitude direction to enable a difference value between the numbers of point locations within the multiple adjusted subregions to be less than a preset threshold. In an embodiment, the adjustment module 133 may be configured to execute the preceding step 330, and for the implementation of the adjustment module 133, reference may be made to the preceding content related to step 330.

Those skilled in the art may understand that, for convenience and conciseness of the description, for the working process of the apparatus described above, reference may be made to the corresponding process in the preceding method, which is not repeated herein.

To sum up, according to the method and apparatus for processing map point location information and the server 100 provided by the embodiments of the present application, a to-be-marked region is divided into multiple subregions according to the total number of point locations within the to-be-marked region, and the multiple point locations are divided into the multiple subregions respectively according to location information of the multiple point locations within the to-be-marked region. Finally, numbers of point locations within the multiple subregions are acquired respectively, and the length of the multiple subregions in a longitude direction and the length of the multiple subregions in a latitude direction are adjusted according to the numbers of point locations within the multiple subregions to enable the difference value between the numbers of point locations within the multiple adjusted subregions to be less than a preset threshold. Longitude information of the multiple subregions and latitude information of the multiple subregions are adjusted according to the numbers of point locations within the multiple subregions to enable the point locations within the obtained multiple subregions are similar in numbers. In this way, the subsequent point location search for different subregions has little difference in search time, and the instability of the search time is improved.

The apparatus and method disclosed in the embodiments of the present application may be implemented in other manners. The apparatus embodiments described herein are merely illustrative. For example, the flowcharts and block diagrams in the drawings illustrate possible implementation of architectures, functions and operations of the apparatus, method and computer program product according to the embodiments of the present application. In this regard, each block in a flowchart or block diagram may represent a module, a program segment, or part of codes that contains one or more executable instructions for implementing specified logical functions. In some alternative implementations, the functions marked in the blocks may occur in an order different than those marked in the drawings. For example, two sequential blocks may, in fact, be executed substantially concurrently, or sometimes executed in the reverse order, which depends on the involved functions. It is to be noted that each block in the block diagrams and/or flowcharts, and combinations of blocks in the block diagrams and/or flowcharts may be implemented by not only specific-purpose hardware-based systems that perform specified functions or actions, but also combinations of specific-purpose hardware and computer instructions.

As used herein, the term "including", "containing" or any other variant thereof is intended to encompass a non-exclusive inclusion so that a process, method, article or device that includes a series of elements not only includes the expressly listed elements but also includes other elements that are not expressly listed or are inherent to such process, method, article or device. In the absence of more restrictions, the elements defined by the statement "including a . . . " do not exclude the presence of additional identical elements in the process, method, article or device that includes the elements.

What is claimed is:

1. A method for processing map point location information, the method being applied to a server and comprising:

acquiring a total number of a plurality of point locations within a to-be-marked region in an electronic map, and dividing the to-be-marked region into a plurality of subregions according to the total number of point locations; wherein the plurality of subregions have a same length in a longitude direction and a same length in a latitude direction;

dividing the plurality of point locations into the plurality of subregions respectively according to location information of the plurality of point locations within the to-be-marked region; and acquiring numbers of point locations within the plurality of subregions respectively, and adjusting, according to the numbers of point locations within the plurality of subregions, the length of the plurality of subregions in the longitude direction and the length of the plurality of subregions in the latitude direction to adjust a difference value between the numbers of point locations within the plurality of adjusted subregions to less than a preset threshold;

wherein adjusting, according to the numbers of point locations within the plurality of subregions, the length of the plurality of subregions in the longitude direction and the length of the plurality of subregions in the latitude direction to adjust the difference value between the numbers of point locations within the plurality of adjusted subregions to less than the preset threshold comprises:
- establishing an index array according to a number of the plurality of subregions, the length of the plurality of subregions in the longitude direction and the length of the plurality of subregions in the latitude direction; wherein the index array comprises a plurality of index vectors;
- establishing a normal distribution graph of the plurality of point locations within the to-be-marked region based on lengths of the plurality of index vectors and numbers of point locations respectively corresponding to the plurality of index vectors; wherein an abscissa of the normal distribution graph represents the lengths of the plurality of index vectors, and an ordinate of the normal distribution graph represents a quotient of a number of point locations corresponding to each of the plurality of index vectors and a length of the each of the plurality of index vectors; and
- adjusting, according to a correspondence between diagram areas and abscissa spacing values in the normal distribution graph, the lengths of the plurality of index vectors in the normal distribution graph to adjust difference values between the diagram areas corresponding to the plurality of adjusted index vectors to less than the preset threshold.

2. The method according to claim 1, wherein adjusting, according to the correspondence between the diagram areas and the abscissa spacing values in the normal distribution graph, the lengths of the plurality of index vectors in the normal distribution graph to adjust the difference values between the diagram areas corresponding to the plurality of adjusted index vectors to less than the preset threshold comprises:
- finding the correspondence between the diagram areas and the abscissa spacing values in the normal distribution graph according to a preset initial abscissa spacing value to obtain a preset diagram area corresponding to the preset initial abscissa spacing value; and
- adjusting, according to the obtained preset diagram area, the lengths of the plurality of index vectors in the normal distribution graph to adjust each of the difference values between the diagram areas corresponding to the plurality of adjusted index vectors and the preset diagram area to less than the preset threshold.

3. The method according to claim 2, further comprising:
- acquiring a search request, wherein the search request comprises point location information of a to-be-searched-for point location;
- processing the point location information of the to-be-searched-for point location by utilizing a preset normal distribution function to obtain a subregion to which the to-be-searched-for point location belongs; and
- searching the obtained subregion to which the to-be-searched-for point location belongs to obtain a corresponding point location according to the point location information of the to-be-searched-for point location.

4. The method according to claim 1, further comprising:
- acquiring a search request, wherein the search request comprises point location information of a to-be-searched-for point location;
- processing the point location information of the to-be-searched-for point location by utilizing a preset normal distribution function to obtain a subregion to which the to-be-searched-for point location belongs; and
- searching the obtained subregion to which the to-be-searched-for point location belongs to obtain a corresponding point location according to the point location information of the to-be-searched-for point location.

5. The method according to claim 4, further comprising:
- feeding back point location information of a point location obtained by searching in a preset duration to a client sending the search request at preset-duration intervals, and recording the point location information currently fed back to the client.

6. The method according to claim 5, further comprising:
- after the search request is acquired, detecting whether the point location information of the point location corresponding to the search request and fed back to the client is currently stored;
- wherein in response to the point location information of the point location corresponding to the search request and fed back to the client being stored, searching the obtained subregion to which the to-be-searched-for point location belongs to obtain the corresponding point location according to the point location information of the to-be-searched-for point location comprises:
- filtering out the point location fed back to the client from point locations within the obtained subregion to which the to-be-searched-for point location belongs; and
- searching the filtered subregion to which the to-be-searched-for point location belongs to obtain the corresponding point location according to the point location information of the to-be-searched-for point location.

7. The method according to claim 6, further comprising:
- detecting whether the search request carries an aggregation tag;
- wherein in response to the search request carrying the aggregation tag, after searching the obtained subregion to which the to-be-searched-for point location belongs to obtain the point location corresponding to the point location information according to the point location information of the to-be-searched-for point location, the method further comprises:
- performing aggregation processing on point location information of point locations obtained by searching, and feeding back aggregation information of the point locations obtained after the aggregation processing to a client sending the search request.

8. The method according to claim 5, further comprising:
- detecting whether the search request carries an aggregation tag;
- wherein in response to the search request carrying the aggregation tag, after searching the obtained subregion to which the to-be-searched-for point location belongs to obtain the point location corresponding to the point location information according to the point location information of the to-be-searched-for point location, the method further comprises:
- performing aggregation processing on point location information of point locations obtained by searching, and feeding back aggregation information of the point locations obtained after the aggregation processing to a client sending the search request.

9. The method according to claim 4, wherein each of the plurality of point locations is marked with a permission tag, and searching the obtained subregion to which the to-be-searched-for point location belongs to obtain the corresponding point location according to the point location information of the to-be-searched-for point location comprises:

acquiring permission information comprised in the search request;
extracting point locations corresponding to the permission information from the subregion to which the to-be-searched-for point location belongs according to permission tags of a plurality of point locations within the subregion to which the to-be-searched-for point location belongs; and
searching the extracted point locations to obtain the point location corresponding to the point location information.

10. The method according to claim 9, further comprising:
detecting whether the search request carries an aggregation tag;
wherein in response to the search request carrying the aggregation tag, after searching the obtained subregion to which the to-be-searched-for point location belongs to obtain the point location corresponding to the point location information according to the point location information of the to-be-searched-for point location, the method further comprises:
performing aggregation processing on point location information of point locations obtained by searching, and feeding back aggregation information of the point locations obtained after the aggregation processing to a client sending the search request.

11. The method according to claim 4, further comprising:
detecting whether the search request carries an aggregation tag;
wherein in response to the search request carrying the aggregation tag, after searching the obtained subregion to which the to-be-searched-for point location belongs to obtain the point location corresponding to the point location information according to the point location information of the to-be-searched-for point location, the method further comprises:
performing aggregation processing on point location information of point locations obtained by searching, and feeding back aggregation information of the point locations obtained after the aggregation processing to a client sending the search request.

12. A server, comprising a memory, a processor and a computer program stored in the memory and executable on the processor; wherein the processor, when executing the computer program, implements the following steps:
acquiring a total number of a plurality of point locations within a to-be-marked region in an electronic map, and dividing the to-be-marked region into a plurality of subregions according to the total number of point locations; wherein the plurality of subregions have a same length in a longitude direction and a same length in a latitude direction;
dividing the plurality of point locations into the plurality of subregions respectively according to location information of the plurality of point locations within the to-be-marked region; and
acquiring numbers of point locations within the plurality of subregions respectively, and adjusting, according to the numbers of point locations within the plurality of subregions, the length of the plurality of subregions in the longitude direction and the length of the plurality of subregions in the latitude direction to adjust a difference value between the numbers of point locations within the plurality of adjusted subregions to less than a preset threshold;
wherein the processor implements adjusting, according to the numbers of point locations within the plurality of subregions, the length of the plurality of subregions in the longitude direction and the length of the plurality of subregions in the latitude direction to adjust the difference value between the numbers of point locations within the plurality of adjusted subregions to less than the preset threshold by:
establishing an index array according to a number of the plurality of subregions, the length of the plurality of subregions in the longitude direction and the length of the plurality of subregions in the latitude direction; wherein the index array comprises a plurality of index vectors;
establishing a normal distribution graph of the plurality of point locations within the to-be-marked region based on lengths of the plurality of index vectors and numbers of point locations respectively corresponding to the plurality of index vectors; wherein an abscissa of the normal distribution graph represents the lengths of the plurality of index vectors, and an ordinate of the normal distribution graph represents a quotient of a number of point locations corresponding to each of the plurality of index vectors and a length of the each of the plurality of index vectors; and
adjusting, according to a correspondence between diagram areas and abscissa spacing values in the normal distribution graph, the lengths of the plurality of index vectors in the normal distribution graph to adjust difference values between the diagram areas corresponding to the plurality of adjusted index vectors to less than the preset threshold.

13. The server according to claim 12, wherein the processor implements adjusting, according to the correspondence between the diagram areas and the abscissa spacing values in the normal distribution graph, the lengths of the plurality of index vectors in the normal distribution graph to adjust the difference values between the diagram areas corresponding to the plurality of adjusted index vectors to less than the preset threshold by:
finding the correspondence between the diagram areas and the abscissa spacing values in the normal distribution graph according to a preset initial abscissa spacing value to obtain a preset diagram area corresponding to the preset initial abscissa spacing value; and
adjusting, according to the obtained preset diagram area, the lengths of the plurality of index vectors in the normal distribution graph to adjust each of the difference values between the diagram areas corresponding to the plurality of adjusted index vectors and the preset diagram area to less than the preset threshold.

14. The server according to claim 13, wherein the processor further implements:
acquiring a search request, wherein the search request comprises point location information of a to-be-searched-for point location;
processing the point location information of the to-be-searched-for point location by utilizing a preset normal distribution function to obtain a subregion to which the to-be-searched-for point location belongs; and
searching the obtained subregion to which the to-be-searched-for point location belongs to obtain a corresponding point location according to the point location information of the to-be-searched-for point location.

15. The server according to claim 12, wherein the processor further implements:
acquiring a search request, wherein the search request comprises point location information of a to-be-searched-for point location;

processing the point location information of the to-be-searched-for point location by utilizing a preset normal distribution function to obtain a subregion to which the to-be-searched-for point location belongs; and searching the obtained subregion to which the to-be-searched-for point location belongs to obtain a corresponding point location according to the point location information of the to-be-searched-for point location.

16. The server according to claim 15, wherein the processor further implements:

feeding back point location information of a point location obtained by searching in a preset duration to a client sending the search request at preset-duration intervals, and recording the point location information currently fed back to the client.

17. The server according to claim 16, wherein the processor further implements:

after the search request is acquired, detecting whether the point location information of the point location corresponding to the search request and fed back to the client is currently stored;

wherein in response to the point location information of the point location corresponding to the search request and fed back to the client being stored, the processor implements searching the obtained subregion to which the to-be-searched-for point location belongs to obtain the corresponding point location according to the point location information of the to-be-searched-for point location by:

filtering out the point location fed back to the client from point locations within the obtained subregion to which the to-be-searched-for point location belongs; and searching the filtered subregion to which the to-be-searched-for point location belongs to obtain the corresponding point location according to the point location information of the to-be-searched-for point location.

18. The server according to claim 16, wherein the processor further implements:

detecting whether the search request carries an aggregation tag;

wherein in response to the search request carrying the aggregation tag, after searching the obtained subregion to which the to-be-searched-for point location belongs to obtain the point location corresponding to the point location information according to the point location information of the to-be-searched-for point location, the processor further implements:

performing aggregation processing on point location information of point locations obtained by searching, and feeding back aggregation information of the point locations obtained after the aggregation processing to a client sending the search request.

19. The server according to claim 15, wherein each of the plurality of point locations is marked with a permission tag, and the processor implements searching the obtained subregion to which the to-be-searched-for point location belongs to obtain the corresponding point location according to the point location information of the to-be-searched-for point location by:

acquiring permission information comprised in the search request;

extracting point locations corresponding to the permission information from the subregion to which the to-be-searched-for point location belongs according to permission tags of a plurality of point locations within the subregion to which the to-be-searched-for point location belongs; and searching the extracted point locations to obtain the point location corresponding to the point location information.

20. The server according to claim 15, wherein the processor further implements:

detecting whether the search request carries an aggregation tag;

wherein in response to the search request carrying the aggregation tag, after searching the obtained subregion to which the to-be-searched-for point location belongs to obtain the point location corresponding to the point location information according to the point location information of the to-be-searched-for point location, the processor further implements:

performing aggregation processing on point location information of point locations obtained by searching, and feeding back aggregation information of the point locations obtained after the aggregation processing to a client sending the search request.

* * * * *